United States Patent
Sheasby et al.

(10) Patent No.: US 6,469,702 B1
(45) Date of Patent: Oct. 22, 2002

(54) METHOD AND SYSTEM FOR EDITING FUNCTION CURVES IN TWO DIMENSIONS

(75) Inventors: Michael Chilton Sheasby; Rejean Gagne; Sylvain Moreau, all of Montréal; Michael Gachet, Westmount; Daniel Desbois, Boucherville, all of (CA); Michel Gangnet, Saint-germain en laye (FR)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/292,669

(22) Filed: Apr. 16, 1999

(51) Int. Cl.[7] .............................................. G06T 11/20
(52) U.S. Cl. ...................................................... 345/442
(58) Field of Search ................................ 345/118, 121, 345/438–442, 473–475, 949, 440, 440.1, 440.2, 441, 861, 956, 960

(56) References Cited

U.S. PATENT DOCUMENTS

| | | | |
|---|---|---|---|
| 4,694,407 A | 9/1987 | Ogden | |
| 5,317,682 A | 5/1994 | Luken, Jr. | |
| 5,396,590 A | 3/1995 | Kreegar | 395/159 |
| 5,422,990 A | 6/1995 | Silverbrook et al. | |
| 5,475,804 A | 12/1995 | Bennett | |
| 5,640,499 A | 6/1997 | Nagai et al. | 395/133 |
| 5,717,848 A | 2/1998 | Watanabe et al. | |
| 5,717,905 A | 2/1998 | Iwanmoto et al. | |
| 5,774,130 A | 6/1998 | Horikawa et al. | |
| 5,802,535 A | 9/1998 | Shibuta | |
| 5,854,634 A | * 12/1998 | Kroitor | 345/473 |
| 5,933,549 A | * 8/1999 | Ide et al. | 382/309 |
| 5,949,434 A | 9/1999 | Charlton | |
| 5,952,994 A | 9/1999 | Ong et al. | |
| 5,966,139 A | 10/1999 | Anupam et al. | |
| 6,108,011 A | * 8/2000 | Fowler | 345/441 |
| 6,133,914 A | 10/2000 | Rogers et al. | |
| 6,154,221 A | 11/2000 | Gagnet | |
| 6,310,621 B1 | 10/2001 | Gagne et al. | |

FOREIGN PATENT DOCUMENTS

| | | | | |
|---|---|---|---|---|
| EP | 0 847 028 A2 | 10/1998 | .......... | G06T/11/20 |
| GB | 2 303 281 A | 12/1997 | .......... | G06T/13/00 |

OTHER PUBLICATIONS

"Plants, Fractals and Formal Languages", A. Smith, Jul. 1998, Computer Graphics, vol. 18, No. 3, pp. 1–10.

\* cited by examiner

*Primary Examiner*—Jeffery Brier
*Assistant Examiner*—G. F. Cunningham
(74) *Attorney, Agent, or Firm*—Peter J. Gordon, Esq.

(57) ABSTRACT

A method and system for editing function curves in a computer-based editing or animation environment. The method consists of defining a region having two dimensions. The region contains a number of selected keys associated with one or more function curves. Resizing or moving the region causes the selected keys to be resized or moved accordingly.

42 Claims, 10 Drawing Sheets

METHOD AND SYSTEM FOR EDITING FUNCTION CURVES IN TWO DIMENSIONS

FIELD OF THE INVENTION

The present invention relates to computer-based editing systems and methods. More particularly, the present invention relates to a method and system for editing function curves in two dimensions, such as time and value.

BACKGROUND OF THE INVENTION

One of the advantages of digital animation and digital post-production editing systems is the ease with which users can manipulate and edit animation objects to produce a desired result. Developers of such systems continually strive to provide simpler and more time effective methods to control this editing process.

One method of editing objects is through modification of function curves. A function curve is a line representing the value of a parameter of an object with respect to time. Changing the shape or location of the function curve causes an attendant change in the parameter and the object. One method of editing, or modifying, a function curve involves setting keys on the curve and modifying the position of the keys to change the shape and/or position of the curve. A key is a point, associated with a function curve, that has coordinates (x,y), such as time and value. The shape of function curve is determined by calculating, or interpolating, curve segments between the keys. Changing the position of a key causes its associated function curve to be recalculated to fit between the newly positioned key. Each key can be separately selected and modified, or multiple selections of keys can be operated on at once. In the prior art, the set of operations that can be applied to a multiple selection of keys is generally limited to some subset of operations, such as translation in time, and deletion. As a result, certain operations, such as scaling a multiple selection of keys, can be time consuming and inexact.

It is, therefore, desirable to provide a method and system for editing function curves that obviates or mitigates the disadvantages of the prior art. In particular, it is desirable to provide a method and system for editing function curves that permits the simultaneous modification of multiple keys within a graphical user interface.

SUMMARY OF THE INVENTION

According to a first aspect of the present invention, there is provided a method for editing an object in a computer-based editing system, comprising the steps of:

(i) defining a region containing selected keys associated with at least one function curve of an object, the region having a first and a second dimension;

(ii) modifying the region in at least one dimension;

(iii) shifting the selected keys in response to the modification to region; and (iv) recalculating the at least one function curve in response to the shifted keys.

According to a further aspect of the present invention, there is provided a system for editing objects in an animation editor, comprising:

an input device for defining a two- dimensional region in an animation editor window, the region containing selected keys associated with at least one function curve of an object;

means to modify the region in at least one dimension;

means to shift the selected keys in response to the modification of the region, and means to recalculate, in response to the shifting of the keys, the at least one function curve.

BRIEF DESCRIPTION OF THE DRAWINGS

Preferred embodiments of the present invention will now be described, by way of example only, with reference to the attached Figures, wherein.

DETAILED DESCRIPTION

The present invention provides a system and method for editing digital information, such as digital video, digital audio, 3D geometric models, animations and the like, is forming a 3D or multimedia production.

Figure 1:
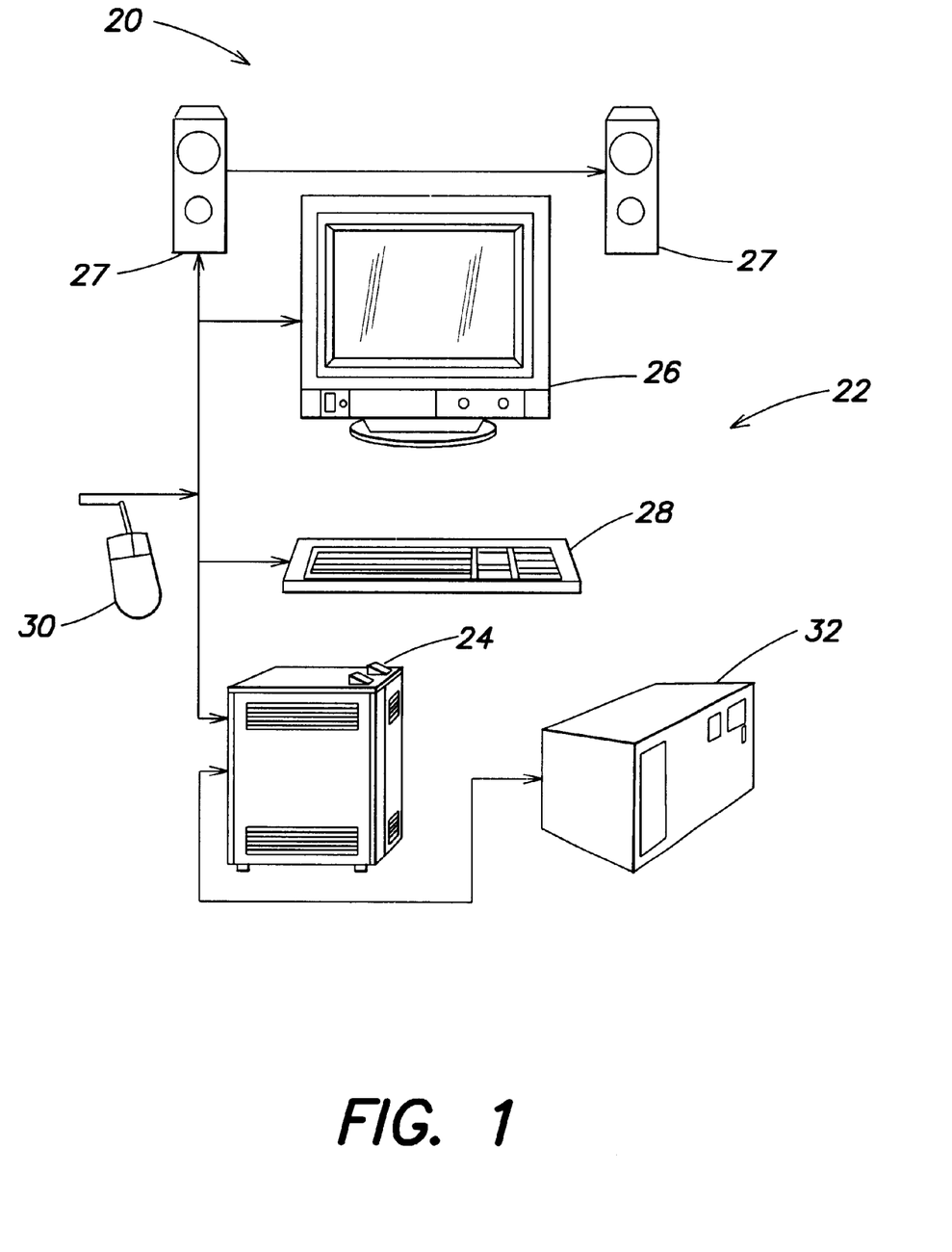
FIG. 1 is a schematic of an editing system according to an embodiment of the present invention.

A 3D animation and/or digital post-production editing system and apparatus is indicated generally at 20 in FIG. 1. System 20 comprises one or more workstations 22, each of which includes a general purpose computer 24, such as a personal computer with a 400 MHz Intel Pentium II processor executing the Windows NT v.4.0 operating system. Computer 24 is provided with an appropriate animation or digital post-production software application, such as SOFTIMAGE|3D v.3.7 or SOFTIMAGE|DS v.2.1. Computer 24 is equipped with one or more appropriate special purpose peripheral processor cards, such as a DigiSuite video card set manufactured by Matrox and a Kefren sound processing card manufactured by Merging Technologies. A video display 26, such as a 21 inch NEC Multisync monitor, and speakers 27, are operatively connected to computer 24, a number of input devices, such as a keyboard 30, a mouse 44, a digitizer, and/or an audio playback system (not shown). Workstations 22 could also include peripheral editing equipment such as video and audio tape, or disk, recording and playback devices.

Computer 24 is also operatively connected to a relatively large capacity random access storage means 32. In a presently preferred embodiment, storage means 32 comprises a RAID storage array, such as a model 6900 RAID storage device manufactured by Ciprico. Such RAID arrays are presently preferred as random access storage devices as they combine acceptable retrieval speed with large capacity, however any other suitable storage device can also be employed with the present invention, as will occur to those of skill in the art. For example, in some circumstances, for speed or other reasons, digital information can be stored in RAM in computer 24 while one or more projects are being prepared, or rendered with system 20. Accordingly, as used herein, the term "storage means" is intended to comprise a RAID storage device or the like, RAM memory in computer 24 and any other suitable random access storage techniques and/or devices wherein digital information can be maintained for use by system 20.

As will be understood by those of skill in the art, digital information is loaded onto storage means 32 by users as required. For example, video information from an analog source can be digitized to a desired resolution, or resolutions, and loaded onto storage means 32. Digital video information can be transferred directly to storage means 32, from optical disc, tape or other storage means, or via a network connection, still image source information, and any other desired source material can be digitized, if necessary, and loaded onto storage means 32 as desired. The loading of information onto a storage means is accomplished by loading directly from a desired source, or as the result of an intermediate rendering of an effect or the like.

Figure 2:
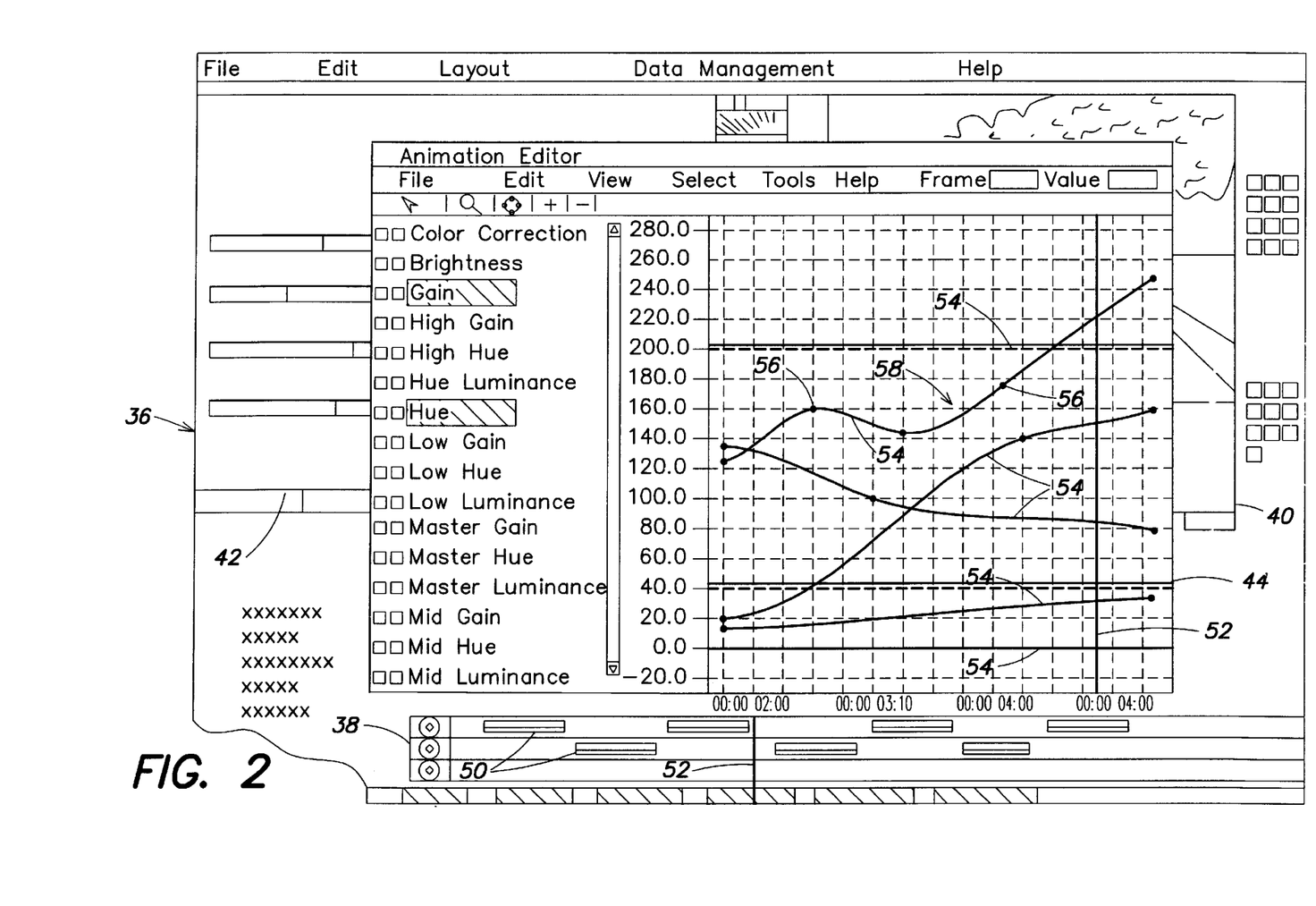
FIG. 2 is a view of a user interface according to an embodiment of the present invention.

Employing system 20, a 3D animation or other digitally edited scene can be composed and edited. FIG. 2 shows a typical graphical user interface 36 employed by a user to compose and edit a scene. Embodiments of the present invention will be described with reference to the illustrated SOFTIMAGE|DS v.2.1 interface. However, as will be apparent from the following description, the present invention is not limited to any particular user interface or application software package, and can be used in any system employing function curves to represent parameters in two dimensions.

User interface 36 is divided into a number of areas, each displaying particular information used to edit a scene. As shown in FIG. 2, the areas of user interface 36 include a timeline 38, a viewer 40, and editing windows, such as a property editor 42, and an animation editor 44. Generally a scene is formed of a number of clips 50, each containing digital information such as digital video, digital audio, motion capture information, 3D geometric models and/or animation data, still image data, and sequences of digital still images. Clips 50 are placed in timeline 40, which increases in time as one moves to the right. More generally, a scene is composed of objects, including clips 50 themselves, plus effects and layers applied to the scene. The resulting scene can be viewed in viewer 40. Properties and parameters of the objects can be viewed and edited in property editor 42 and animation editor 44. The portion of a scene being viewed or edited is shown by a playback cursor 52, visible in both timeline 40 and animation editor 44.

Generally, editing a composition involves modifying parameters associated with the objects within that composition. As used herein, parameters are any property that can be applied to an object and modified in two dimensions, such as time and parameter value. Each such parameter generates a function curve, which can be viewed in an editing window. The illustrated example shows function curves 54, for effecting color correction, displayed in animation editor 44. Each function curve 54 is a mathematical representation of a parameter's change in value over a period of time. Function curves 54 are displayed graphically as plotted lines in a Cartesian space where the x-axis represents time, and the y-axis represents the parameter's value. Meanwhile, property editor 42 displays the values of the parameters, at the point on timeline 40 indicated by playback cursor 52.

Generally, modifying the shape or position of a function curve 54 modifies the parameter represented by the curve. As described above, one method of editing, or modifying, a function curve involves setting keys 56 and modifying the position of keys 56 to change the shape and/or position of the curve. A key is a point, associated with a function curve, that has coordinates (x,y). In the illustrated example, keys 56 have coordinates of time and value, and the shape of function curve 54 is determined by calculating, or interpolating, curve segments 58 between keys 56. Changing the position of keys 56 causes function curve 54 to be recalculated to fit between the newly positioned keys 56. In the prior art, editing function curves 54 is achieved by separately selecting and repositioning each desired key. Such a prior art editing method is described in commonly assigned U.S. patent application Ser. No. 08/834,396, entitled "Parametric Function Curve Editing", the contents of which are incorporated herein by reference.

U.S. patent application Ser. No. 08/834,396 is now U.S. Pat. No. 6,154,221.

The method and system of the present invention permit multiple keys, and their associated function curves, to be edited as a group, as opposed to editing each key, or function curve, separately. The method of the present invention will be described with reference to the flow chart shown in FIG. 3, and sequence of edited function curves shown in FIGS. 4–10.

Figure 3:
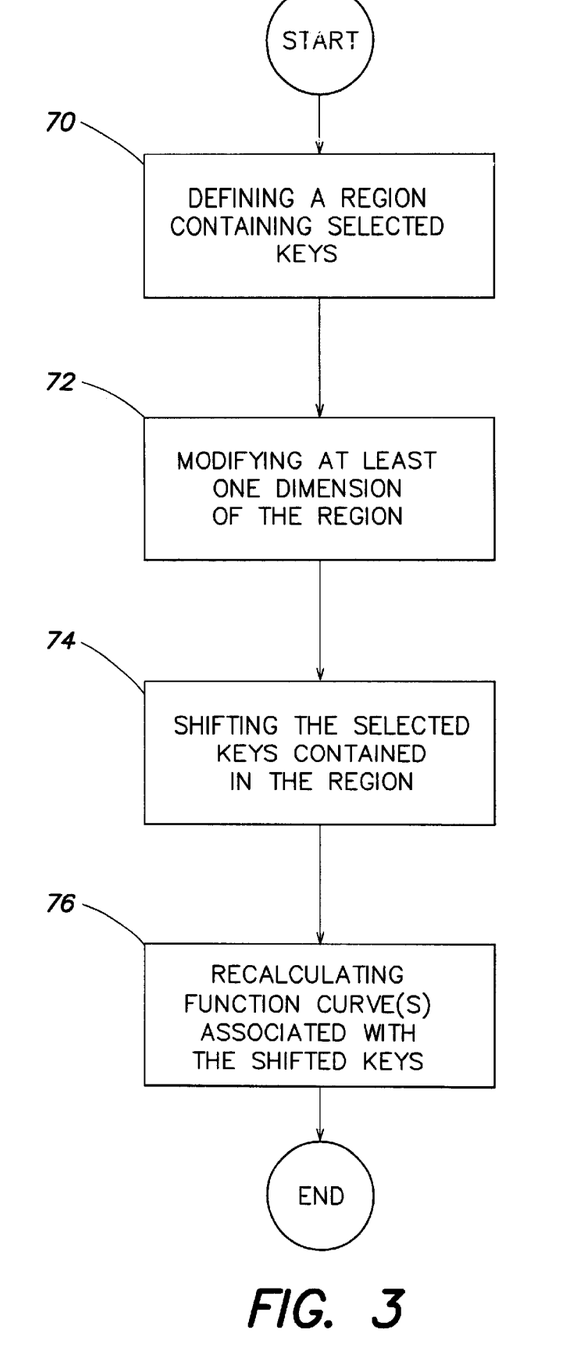
FIG. 3 is a flow chart of a method according to an embodiment of the present invention.

Referring to FIG. 3, the method of the present invention commences, at step 70, by defining a region containing selected keys. Typically, multiple keys are selected, and the selected keys can be associated with a plurality of function curves. In a preferred embodiment, the defined region is a rectangular region having first and second dimensions within the coordinate system of the selected keys.

The method proceeds to step 72, where the region is modified in at least one dimension. As will be described in greater detail below, this modification can result in scaling or translation of the region. In a presently preferred embodiment, this modification is effected by grabbing and moving the region, or boundaries of the region, with an input device, such as a mouse.

Following to step 74, the selected keys are shifted in response to the modification to the region. For example, if the region is scaled in relation to the x-axis of the coordinate system, the selected keys within the region are similarly scaled with respect to the x-axis. Or, if the region is translated by (x', y'), the selected keys are similarly translated by (x', y').

Proceeding to step 76, the function curve(s) associated with the selected keys are recalculated in response to the updated selected keys. This recalculation updates, or redraws, the function curves displayed in an editing window.

Figure 4:
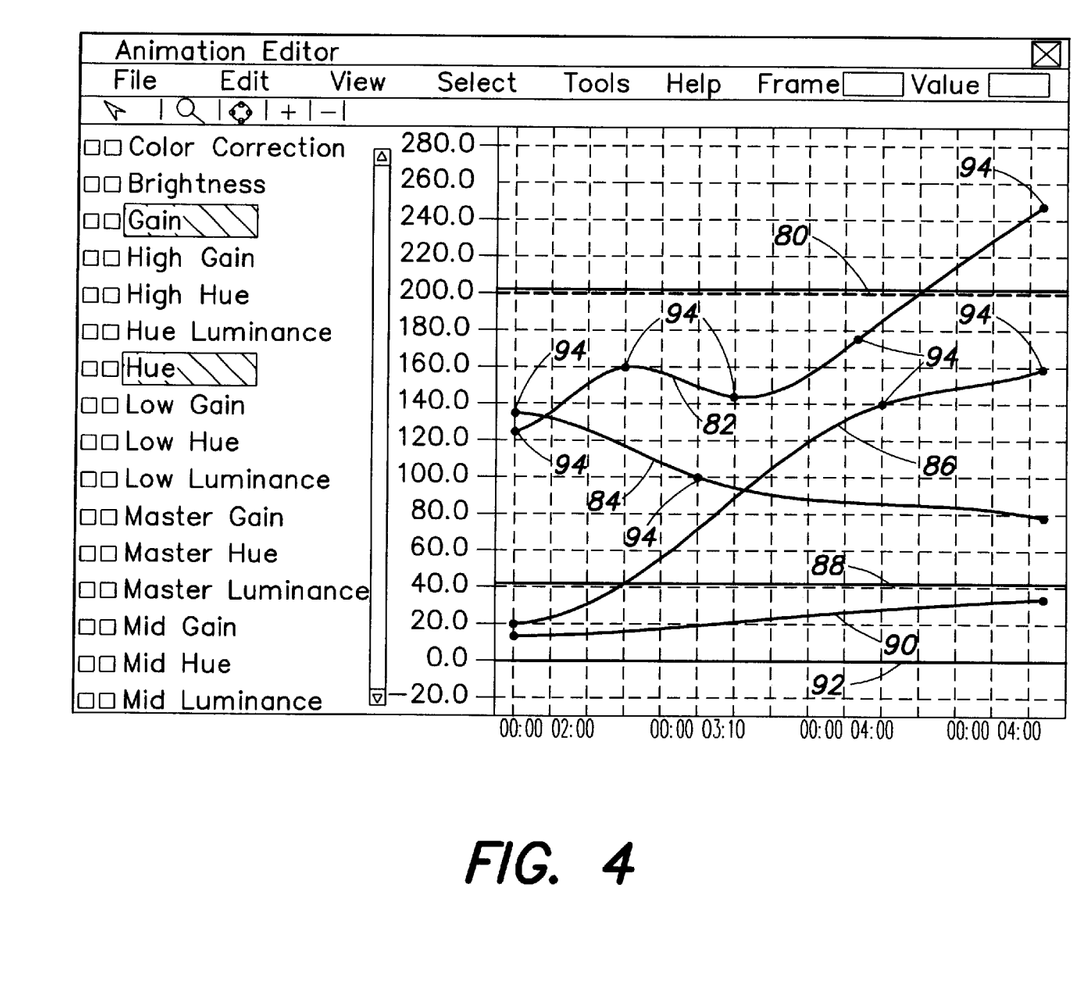
FIG. 4 is a view of an animation editor having selected function curves.

The method of the present invention will now be described in greater detail with reference to the example edit shown as a sequential series of views of an editing window. In FIG. 4, function curves 80, 82, 84, 86, 88, 90 and 92 are shown in animation editor 44. In this example, function curves 82, 84 and 86 have been selected, as shown by their greater contrast and highlighted keys 94. Typically, function curves are selected by clicking on them with an input device, such as a mouse. Selecting function curves 82, 84 and 86 restricts the editing to keys on these selected curves.

Figure 5:
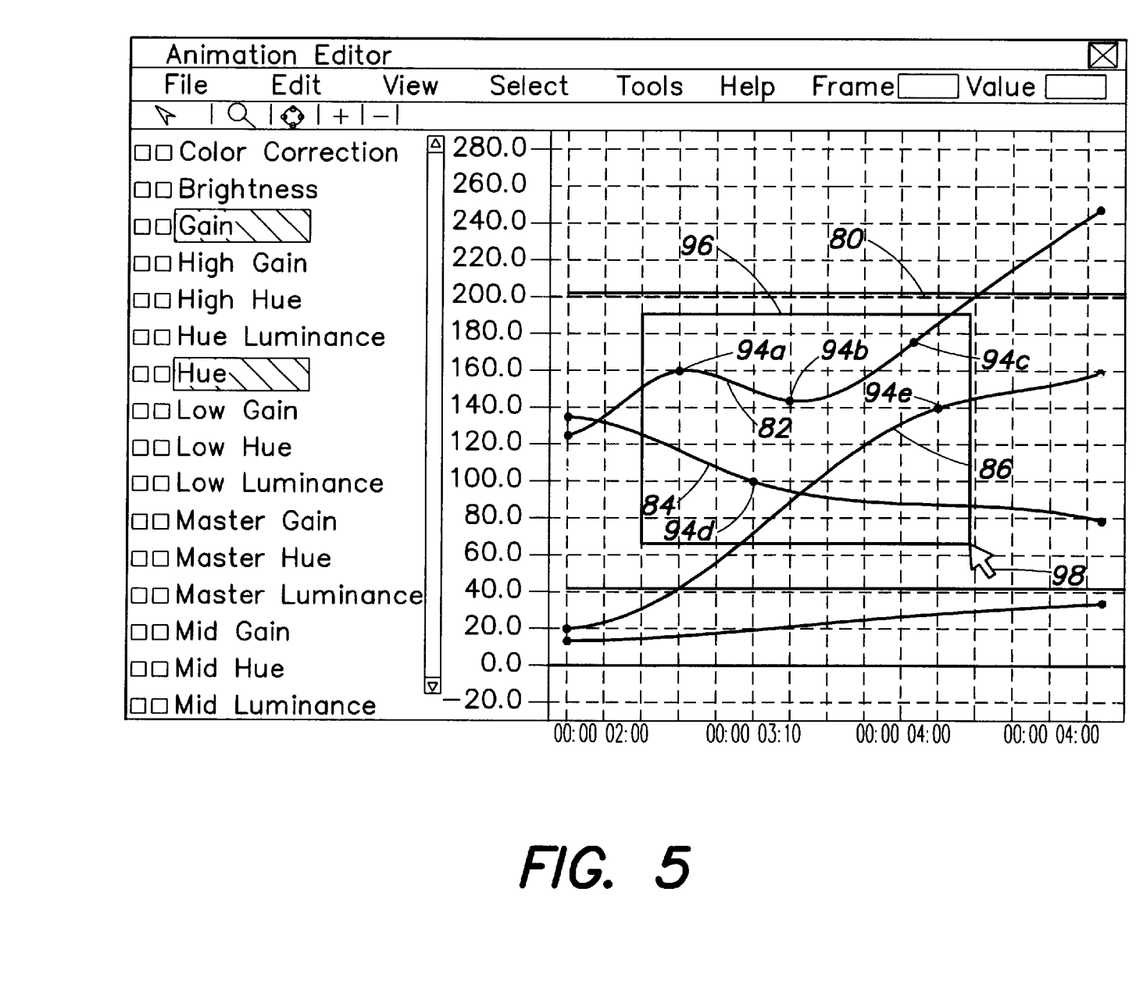
FIG. 5 is a view of the animation editor of FIG. 4, showing the definition of a region.
Figure 6:
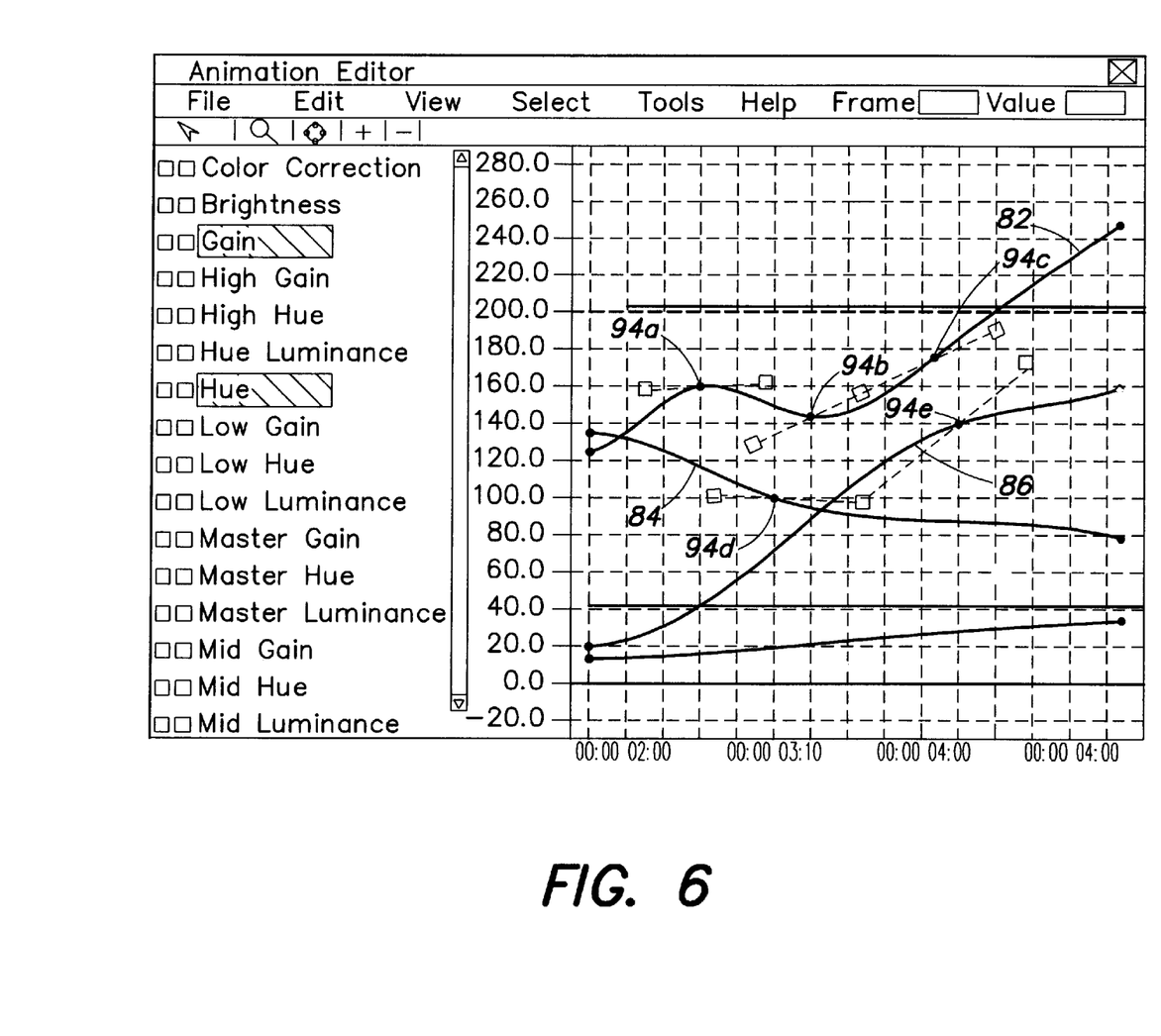
FIG. 6 is a view of the animation editor of FIG. 4, showing selected keys in the region.

Referring to FIG. 5, one method of defining a region 96 is shown. A region is a two dimensional area within animation editor 44. In the illustrated example, region 96 has a first dimension along the x-axis, representing time, and a second dimension along the y-axis, representing parameter value. Region 96 is defined in a well known manner by dragging a mouse pointer 98 in diagonal direction within animation editor 44 to define a rectangle. In the illustrated example, mouse pointer 98 is dragged from the upper left corner of region 96 to the lower right corner of region 96. As will be apparent, defining region 96 effectively selects a number of keys 94a, 94b, 94c, 94d and 94e on previously selected function curves 82, 84 and 86. Selected keys 94a, 94b, 94c, 94d and 94e are contained within region 96, and can be seen more clearly in FIG. 6.

Given a selection of keys, region 96 can also be implicitly constructed, or generated, by considering the maximum range of the keys in both the x- and y-directions. One way of doing this is to select the set of keys and to choose an 'edit region' interactive tool, which constructs region 96 automatically. Alternatively, without any keys currently selected, the user can choose an 'edit region' interactive tool and manually pick a timespan by dragging across the editing window with an input device, such as a mouse. The range of time, in the x-direction thus highlighted becomes the time range for region 96, while the takes its y-value is determined by any keys that fall within the span of time highlighted by the user.

Figure 7:
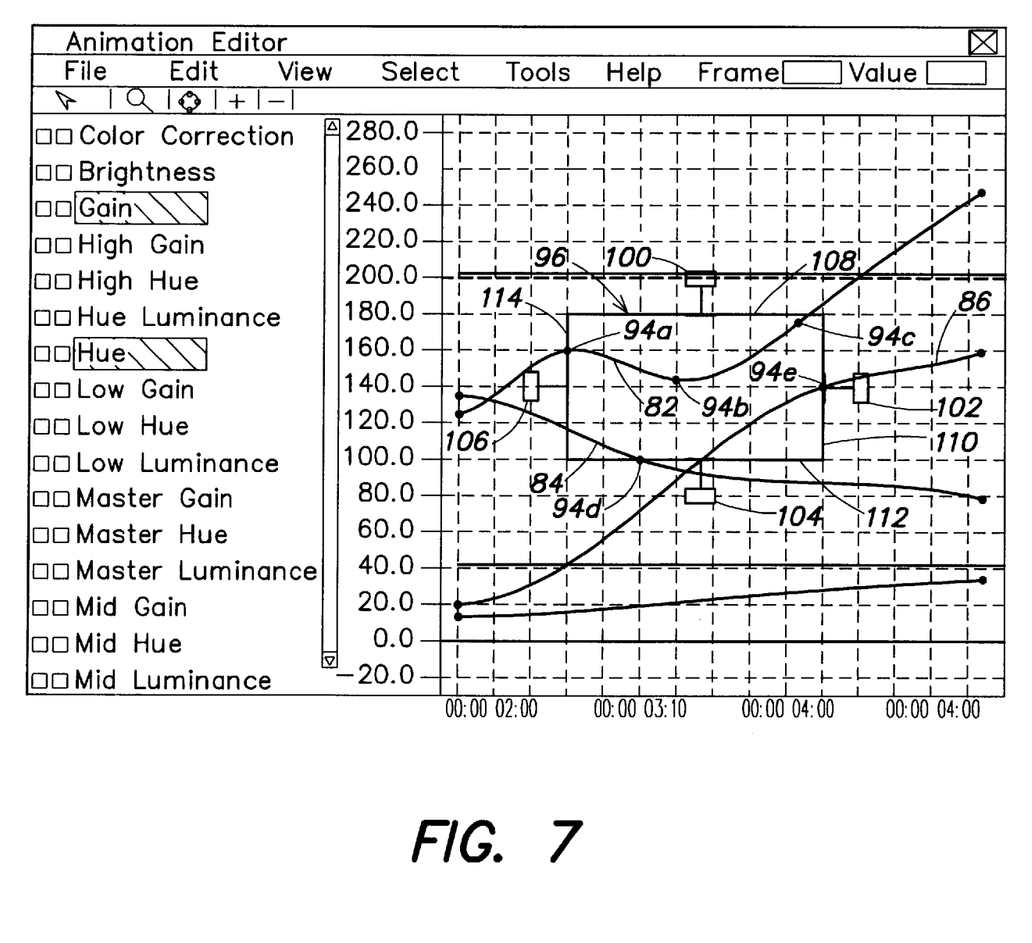
FIG. 7 is a view of the animation editor of FIG. 6, shown in region mode.

Switching to the "edit region" interactive tool, or mode, within animation editor 44, FIG. 7 shows region 96 containing selected keys 94a, 94b, 94c, 94d and 94e. In this mode, handles 100, 102, 104 and 106 are visible at their respective boundaries 108, 110, 112 and 114 of region 96. While this is the presently preferred method of viewing a region and its selected keys, it is fully within the contemplation of the present inventors that a region can be visible as soon as it is defined, and thath tools to modify the region become available in the main animation editor window.

Figure 8:
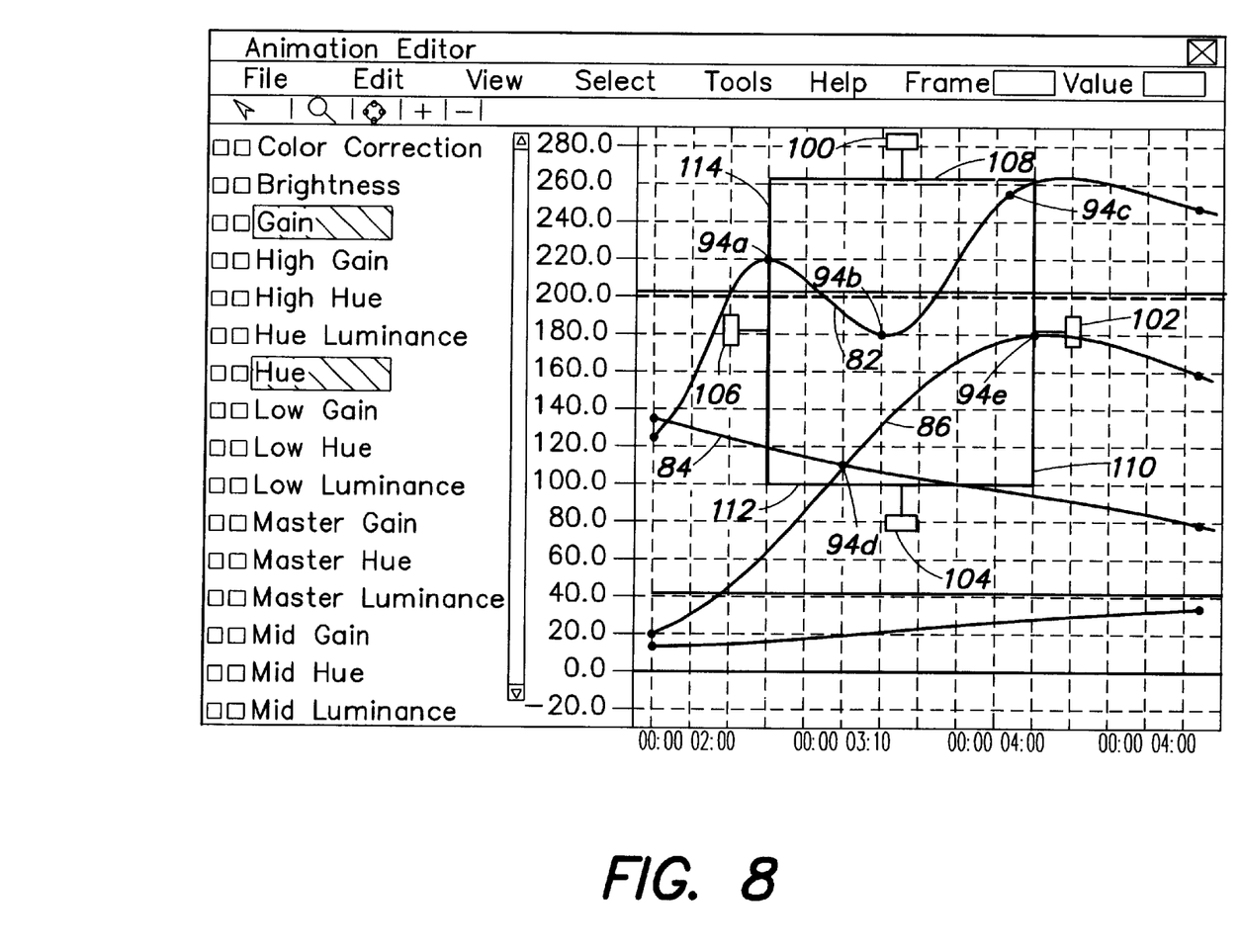
FIG. 8 is a view of the animation editor of FIG. 7, showing the region scaled vertically.

The result of one modification to the dimensions of region 96 is shown in FIG. 8. Region 96 has been scaled by moving upper boundary 108 upwards in relation to the y-axis. In a presently preferred embodiment, this movement of upper boundary 108 if achieved by grabbing handle 100 with an appropriate input device, and moving it upwards until region 96 has been scaled as desired. Alternatively, region 96 can be scaled by appropriate keyboard commands or other suitable means.

A comparison of FIGS. 7 and 8 shows that selected keys 94a, 94b, 94c, 94d and 94e have been scaled along the y-axis in direct relation to the change in dimension of region 96. In a like manner, function curves 82, 84 and 86 have been recalculated between scaled keys 94a, 94b, 94c, 94d and 94e.

Figure 9:
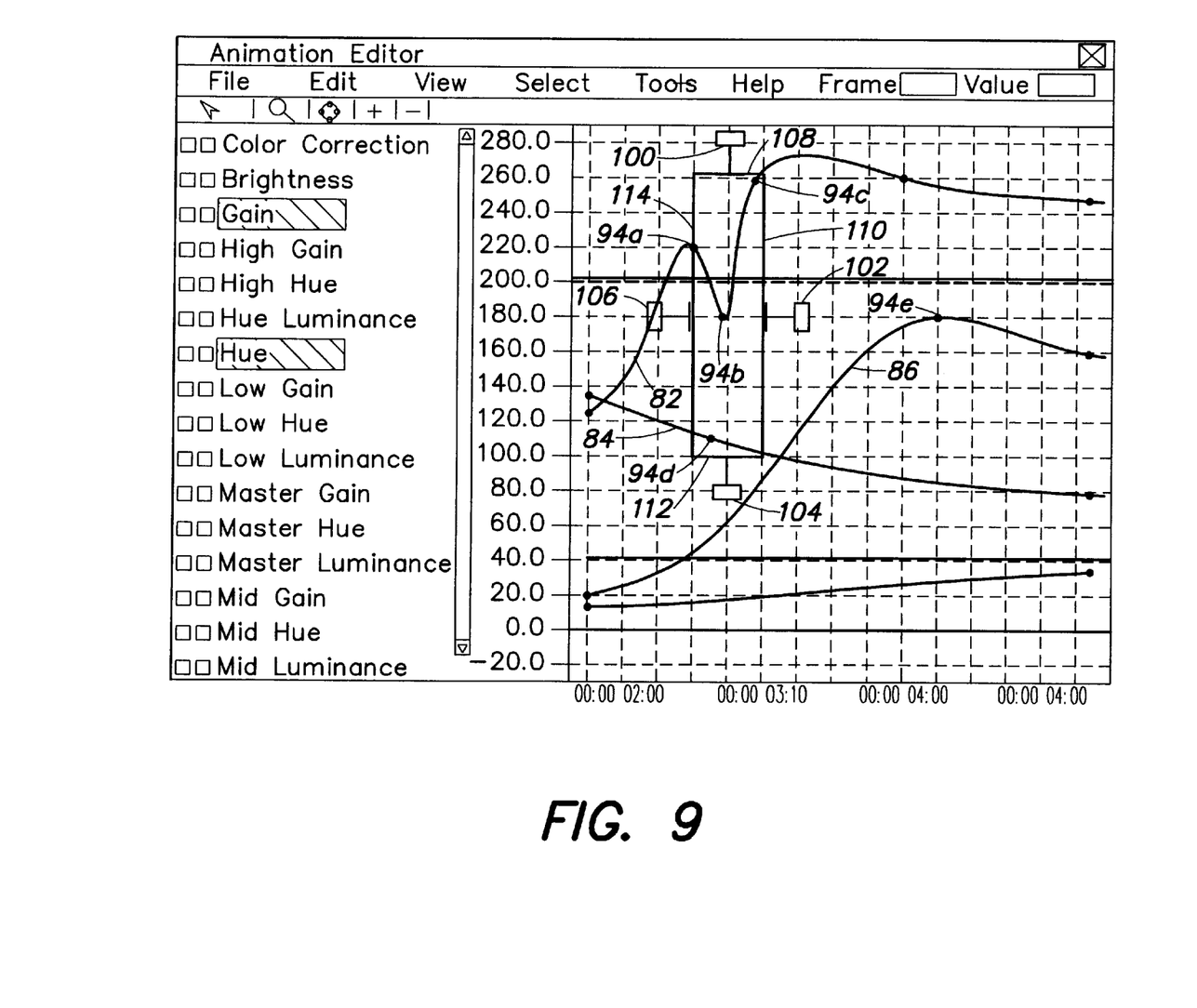
FIG. 9 is a view of the animation editor of FIG. 7, showing the region scaled horizontally.

In FIG. 9, region 96 been redefined and further scaled. Key 94e has been deselected, thereby redefining region 96. Following the redefinition of region 96, region 96 has been scaled to reduce the dimensions of region 96 in the x-direction. As above, grabbing and dragging handle 102 is one manner in which region 96 can be scaled. Again, a comparison between FIGS. 8 and 9 shows the attendant shifting of selected keys 94a, 94b, 94c, and 94d along the x-axis in direct relation to the change in dimension of region 96, and the recalculation of function curves 82 and 84.

Figure 10:
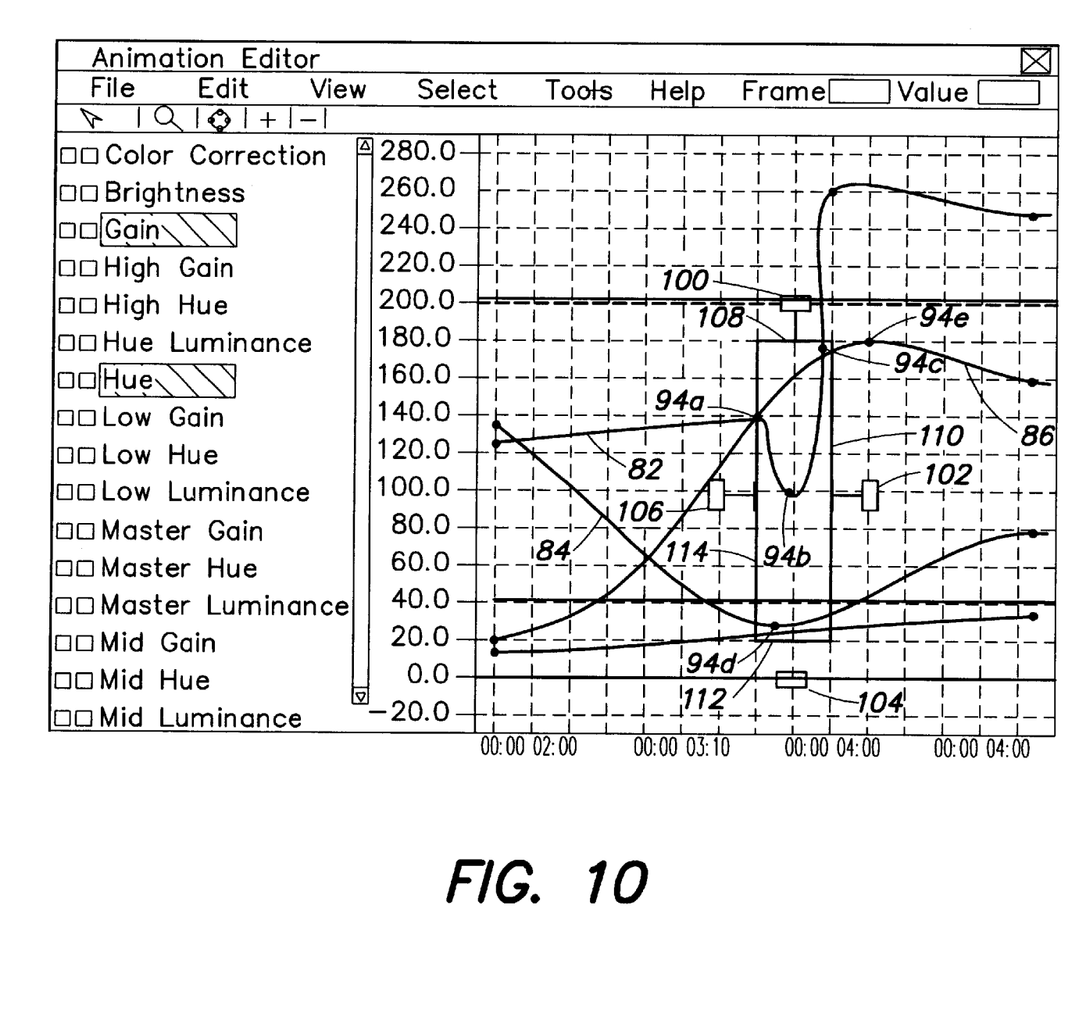
FIG. 10 is a view of the animation editor of FIG. 7, showing the region translated down and to the right.

Finally, in FIG. 10, the result of translating region 96 is shown. Translating, or moving, region 96 involves a modification in two dimensions. In a presently preferred embodiment, region 96 is grabbed with an input device and dragged to a new position within animation editor 44. As can be seen, selected keys 94a, 94b, 94c, and 94d are shifted within animation editor 44 such that they are still contained within region 96, and function curves 82 and 84 are again recalculated.

The present invention provides a number of advantages to a user of a computer-based editing system. Regions permit a user to easily group multiple keys from one or more function curves, and from function curves from one or more objects. Rescaling or moving the region is achieved by simple mouse manipulation, and the selected keys within the region are rescaled or moved accordingly. This saves the user a great deal of time, and also permits repetitive rescaling operations to be done precisely and repeatably.

It will be apparent to those skilled in the art that the foregoing is by way of example only. Modifications, variations and alterations may be made to the described embodiments without departing from the scope of the invention which is defined solely in the claims.

We claim:

1. A method performed by a graphical user interface for a computer based three dimensional animation editing system for editing a function curve defined by one or more key frames associated with a parameter of a animated three dimensional object, comprising:

displaying the function curve and indicia of the key frames defining the function curve on a display;

receiving an indication of a user-specified region containing one or more of the displayed indicia of the key frames, wherein the region has a first dimension and a second dimension;

receiving an indication of a modification to the user-specified region in at least one of the first dimension and the second dimension;

shifting the one or more key frames contained in the region according to the modification to the region;

recalculating the function curve according to the shifted one or more key frames; and displaying the recalculated function curve and indicia of the shifted key frames defining the function curve on the display.

2. The method of claim 1, wherein the step of receiving an indication of a user-specified specified region includes receiving signals from a mouse indicating dragging in an editing window to define a rectangular region on the display.

3. The method of claim 2, wherein the rectangular region contains displayed indicia of a plurality of key frames.

4. The method of claim 1, wherein the indication of a modification includes an indication of scaling of the user-specified region.

5. The method of claim 1, wherein the indication of a modification includes an indication of repositioning of a boundary of the user-specified region.

6. The method of claim 5, wherein the boundary is displayed with an indicia of a handle that can be manipulated by a user using an input device.

7. The method of claim 1, wherein the indication of a modification includes an indication of translating the user-specified region within an editing window.

8. A computer program product, comprising:

a computer readable medium;

computer program instructions stored on the computer readable medium that, when executed by a computer, instruct the computer to perform a method for providing a graphical user interface for a computer based three dimensional animation editing system for editing a function curve defined by one or more key frames associated with a parameter of a animated three dimensional object, the method comprising:

displaying the function curve and indicia of the key frames defining the function curve on a display;

receiving an indication of a user-specified region containing one or more of the displayed indicia of the key frames, wherein the region has a first dimension and a second dimension;

receiving an indication of a modification to the user-specified region in at least one of the first dimension and the second dimension;

shifting the one or more key frames contained in the region according to the modification to the region;

recalculating the function curve according to the shifted one or more key frames; and displaying the recalculated function curve and indicia of the shifted key frames defining the function curve on the display.

9. The computer program product of claim 8, wherein receiving an indication of a user-specified region includes receiving signals from a mouse indicating dragging in an editing window to define a rectangular region on the display.

10. The computer program product of claim 9, wherein the rectangular region contains displayed indicia of a plurality of key frames.

11. The computer program product of claim 8, wherein the indication of a modification includes an indication of scaling of the user-specified region.

12. The computer program product of claim 8, wherein the indication of a modification includes an indication of repositioning of a boundary of the user-specified region.

13. The computer program product of claim 12, wherein the boundary is displayed with an indicia of a handle that can be manipulated by a user using an input device.

14. The computer program product of claim 8, wherein the indication of a modification includes an indication of translating the user-specified region within an editing window.

15. A system for computer based three dimensional animation editing including a graphical user interface for editing a function curve defined by one or more key frames associated with a parameter of a animated three dimensional object, comprising:

means for displaying the function curve and indicia of the key frames defining the function curve on a display;

means for receiving an indication of a user-specified region containing one or more of the displayed indicia of the key frames, wherein the region has a first dimension and a second dimension;

means for receiving an indication of a modification to the user-specified region in at least one of the first dimension and the second dimension;

means for shifting the one or more key frames contained in the region according to the modification to the region;

means for recalculating the function curve according to the shifted one or more key frames; and means for displaying the recalculated function curve and indicia of the shifted key frames defining the function curve on the display.

16. The system of claim 15, wherein the means for receiving an indication of a user-specified region includes means for receiving signals from a mouse indicating dragging in an editing window to define a rectangular region on the display.

17. The system of claim 16, wherein the rectangular region contains displayed indicia of a plurality of key frames.

18. The system of claim 15, wherein the indication of a modification includes an indication of scaling of the user-specified region.

19. The system of claim 15, wherein the indication of a modification includes an indication of repositioning of a boundary of the user-specified region.

20. The system of claim 19, wherein the boundary is displayed with an indicia of a handle that can be manipulated by a user using an input device.

21. The system of claim 15, wherein the indication of a modification includes an indication of translating the user-specified region within an editing window.

22. A method performed by a graphical user interface for editing a function curve defined by one or more key frames associated with a parameter of an operation, comprising:

displaying the function curve and indicia of the key frames defining the function curve on a display;

receiving an indication of a user-specified region containing one or more of the displayed indicia of the key frames, wherein the region has a first dimension and a second dimension;

receiving an indication of a modification to the user-specified region in at least one of the first dimension and the second dimension;

shifting the one or more key frames contained in the region according to the modification to the region;

recalculating the function curve according to the shifted one or more key frames; and displaying the recalculated function curve and indicia of the shifted key frames defining the function curve on the display.

23. The method of claim 22, wherein the receiving an indication of a user-specified region includes receiving signals from a mouse indicating dragging in an editing window to define a rectangular region on the display.

24. The method of claim 23, wherein the rectangular region contains displayed indicia of a plurality of key frames.

25. The method of claim 22, wherein the indication of a modification includes an indication of scaling of the user-specified region.

26. The method of claim 22, wherein the indication of a modification includes an indication of repositioning of a boundary of the user-specified region.

27. The method of claim 26, wherein the boundary is displayed with an indicia of a handle that can be manipulated by a user using an input device.

28. The method of claim 22, wherein the indication of a modification includes an indication of translating the user-specified region within an editing window.

29. A computer program product, comprising:

a computer readable medium;

computer program instructions stored on the computer readable medium that, when executed by a computer, instruct the computer to perform a method for providing a graphical user interface for editing a function curve defined by one or more key frames associated with a parameter of an operation, the method comprising:

displaying the function curve and indicia of the key frames defining the function curve on a display;

receiving an indication of a user-specified region containing one or more of the displayed indicia of the key frames, wherein the region has a first dimension and a second dimension;

receiving an indication of a modification to the user-specified region in at least one of the first dimension and the second dimension;

shifting the one or more key frames contained in the region according to the modification to the region;

recalculating the function curve according to the shifted one or more key frames; and displaying the recalculated function curve and indicia of the shifted key frames defining the function curve on the display.

30. The computer program product of claim 29, wherein receiving an indication of a user-specified region includes receiving signals from a mouse indicating dragging in an editing window to define a rectangular region on the display.

31. The computer program product of claim 30, wherein the rectangular region contains displayed indicia of a plurality of key frames.

32. The computer program product of claim 29, wherein the indication of a modification includes an indication of scaling of the user-specified region.

33. The computer program product of claim 29, wherein the indication of a modification includes an indication of repositioning of a boundary of the user-specified region.

34. The computer program product of claim 33, wherein the boundary is displayed with an indicia of a handle that can be manipulated by a user using an input device.

35. The computer program product of claim 29, wherein the indication of a modification includes an indication of translating the user-specified region within an editing window.

36. A system having a graphical user interface for editing a function curve defined by one or more key frames associated with a parameter of an operation, comprising:

means for displaying the function curve and indicia of the key frames defining the function curve on a display;

means for receiving an indication of a user-specified region containing one or more of the displayed indicia of the key frames, wherein the region has a first dimension and a second dimension;

means for receiving an indication of a modification to the user-specified region in at least one of the first dimension and the second dimension;

means for shifting the one or more key frames contained in the region according to the modification to the region;

means for recalculating the function curve according to the shifted one or more key frames; and means for displaying the recalculated function curve and indicia of the shifted key frames defining the function curve on the display.

37. The system of claim 36, wherein the means for receiving an indication of a user-specified region includes means for receiving signals from a mouse indicating dragging in an editing window to define a rectangular region on the display.

38. The system of claim 37, wherein the rectangular region contains displayed indicia of a plurality of key frames.

39. The system of claim 36, wherein the indication of a modification includes an indication of scaling of the user-specified region.

40. The system of claim 36, wherein the indication of a modification includes an indication of repositioning of a boundary of the user-specified region.

41. The system of claim 40, wherein the boundary is displayed with an indicia of a handle that can be manipulated by a user using an input device.

42. The system of claim 36, wherein the indication of a modification includes an indication of translating the user-specified region within an editing window.

* * * * *